(12) United States Patent　(10) Patent No.: US 8,477,995 B2
Porter et al.　(45) Date of Patent: Jul. 2, 2013

(54) IMAGE PROCESSING DEVICE AND METHOD

(75) Inventors: Robert Mark Stefan Porter, Winchester (GB); Clive Henry Gillard, Alton (GB)

(73) Assignee: Sony Corporation, Tokyo (JP)

( * ) Notice: Subject to any disclaimer, the term of this patent is extended or adjusted under 35 U.S.C. 154(b) by 730 days.

(21) Appl. No.: 12/633,126

(22) Filed: Dec. 8, 2009

(65) Prior Publication Data

US 2010/0208942 A1　Aug. 19, 2010

(30) Foreign Application Priority Data

Feb. 19, 2009　(GB) .................................. 0902841.6

(51) Int. Cl.
 *G06K 9/00*　(2006.01)
(52) U.S. Cl.
 USPC .......................................................... 382/103
(58) Field of Classification Search
 USPC .................................................. 382/100, 103
 See application file for complete search history.

(56) References Cited

U.S. PATENT DOCUMENTS

| 8,016,673 | B2 * | 9/2011 | Takatsuka ........................ 463/32 |
| 2001/0018640 | A1 * | 8/2001 | Matsunaga .................... 701/301 |
| 2003/0179294 | A1 | 9/2003 | Martins | |
| 2007/0092110 | A1 | 4/2007 | Xu et al. | |

FOREIGN PATENT DOCUMENTS

| EP | 1 437 898 A1 | 7/2004 |
| WO | WO 98/43442 | 10/1998 |
| WO | WO 01/49028 A1 | 7/2001 |
| WO | WO 2006/097680 A1 | 9/2006 |
| WO | WO 2006/111893 A1 | 10/2006 |
| WO | WO 2007/096816 A2 | 8/2007 |
| WO | WO 2007/096816 A3 | 8/2007 |

OTHER PUBLICATIONS

GB Search Report issued on Jun. 3, 2009 in GB0902841.6, filed Feb. 19, 2009.
Christoph Fehn, "Depth-Image-Based Rendering (DIBR), Compression and Transmission for a New Approach on 3D-TV." SPIE, vol. 5291, 2004. pp. 93-104.
Extended European Search Report issued Nov. 29, 2010, in Application No. 10250133.5-2202/2222089.

* cited by examiner

*Primary Examiner* — Shefali Goradia
(74) *Attorney, Agent, or Firm* — Oblon, Spivak, McClelland, Maier & Neustadt, L.L.P.

(57) ABSTRACT

An image processing device comprises receiving means operable to receive, from a camera, a captured image corresponding to an image of a scene captured by the camera. The scene contains at least one object. The device comprises determining means operable to determine a distance between the object within the scene and a reference position defined with respect to the camera, and generating means operable to detect a position of the object within the captured image, and to generate a modified image from the captured image based on image features within the captured image which correspond to the object in the scene. The generating means is operable to generate the modified image by displacing the position of the captured object within the modified image with respect to the determined position of the object within the captured image by an object offset amount which is dependent on the distance between the reference position and the object in the scene so that, when the modified image and the captured image are viewed together as a pair of images on a display, the captured object appears to be positioned at a predetermined distance from the display.

23 Claims, 12 Drawing Sheets

IMAGE PROCESSING DEVICE AND METHOD

BACKGROUND OF THE INVENTION

1. Field of the Invention

The present invention relates to an image processing device and method.

2. Description of the Prior Art

Stereoscopic imaging in which a stereo pair of images may be viewed together so as to give an appearance of a three dimensional image has been popular for over a century. To create an illusion that an image is three-dimensional (3D), two slightly different images may be viewed together so that one of the images is viewed by a user's left eye and the other image is viewed by a user's right eye. Provided that the two images correspond to two slightly different views of the same scene (for example each image in the pair being as if seen from the user's left eye and right eye respectively), the user's brain will fool the user into thinking that the pair of images is one three dimensional image when the images are viewed in a suitable manner. An object within the images will appear at an apparent depth from the display which is dependent upon an offset amount between the left-hand image corresponding to that object and the right-hand image corresponding to that object.

In order to try and ensure that each eye sees the image that is intended to be viewed by that eye, many techniques are known. In some techniques, each image of the stereo pair can be reproduced in such a way so as to be separable from the other image. For example, the left-hand image could be displayed next to the right-hand image and a suitable viewer such as a stereoscope used to view the images. This method of displaying the images was used in the earliest forms of 3D images.

Alternatively, a left-hand image intended to be viewed by the left eye may be polarised in the vertical direction, whilst a right-hand image intended to be viewed by the right eye may be polarised in the horizontal direction. The left-hand image and right-hand image are then superimposed on each other. By wearing appropriate glasses in which a polarisation of each lens corresponds with the desired image to be viewed, the correct image for each eye will be viewed by the user. Many other systems of displaying and viewing the images are also known such as circular polarisation, coloured filters (e.g. red/cyan anaglyph), chromadepth, and anachrome; these systems require a user to wear an appropriate pair of glasses. In other systems, such as displays which use a lenticular display system, it is not necessary for a user to wear any glasses in order to view a three-dimensional image.

Several techniques for generating a stereo pair of images are known. A common system for producing a pair of images for viewing together as a stereo pair of images comprises two cameras offset from each other so as to capture two different images of the scene. One camera is used to capture the left-hand image, and the other camera is used to capture the right-hand image. The two captured images can then be viewed together as a 3D image using one of the techniques described above.

Recently, with the advent of high definition video cameras and television broadcasts, some broadcasters have used a pair of high definition video cameras to capture high definition images of sports events such as football matches and boxing matches for reproduction as 3D images. However, current high definition video camera arrays for capturing 3D images are very expensive. Furthermore, mismatches in image luminance and chrominance between the two cameras can cause eye discomfort and headaches for a user as the brain will try and make the two images appear to be the same.

Techniques for generating 3D images from two-dimensional (2D) images are also known. For example, the 2D image may be considered to be the left-hand image for viewing by the left eye. To generate the right-hand image, an operator may select an object within a scene, decide at what depth that object should appear in the scene, and apply an image offset amount for that object within that scene so as to generate the right-hand image. An example of such a process is termed Dimensionalization® which is implemented by In-Three Inc. However, in order to recreate realistically a 3D image from a 2D image, an operator may have to use their artistic judgement regarding the depth of objects within the scene. Furthermore, each frame of video footage or movie still must be marked up individually by the operator so as to define the objects and their respective depths within the image. As well as being expensive, this process can be very time consuming and labour intensive, thus meaning that it is likely to be impossible to create 3D video in real-time from video images captured by a single camera.

The present invention seeks to alleviate or mitigate the above problems.

SUMMARY OF THE INVENTION

In a first aspect, there is provided an image processing device comprising: receiving means operable to receive, from a camera, a captured image corresponding to an image of a scene captured by the camera, the scene containing at least one object; determining means operable to determine a distance between the object within the scene and a reference position defined with respect to the camera; and generating means operable to detect a position of the object within the captured image, and to generate a modified image from the captured image based on image features within the captured image which correspond to the object in the scene, in which: the generating means is operable to generate the modified image by displacing the position of the captured object within the modified image with respect to the determined position of the object within the captured image by an object offset amount which is dependent on the distance between the reference position and the object in the scene so that, to when the modified image and the captured image are viewed together as a pair of images on a display, the captured object appears to be positioned at a predetermined distance from the display.

In a second aspect, there is provided an image processing method comprising: receiving, from a camera, a captured image corresponding to an image of a scene captured by the camera, the scene comprising at least one object; determining a distance between the object within the scene and a reference position defined with respect to the camera; detecting a position of the object within the captured image; and generating a modified image from the captured image based on image features within the captured image which correspond to the object in the scene by displacing the position of the captured object within the modified image with respect to the determined position of the object within the captured image by an object offset amount which is dependent on the distance between the reference position and the object in the scene so that, when the modified image and the captured image are viewed together as a pair of images on a display, the captured object appears to be positioned at a predetermined distance from the display.

Embodiments of the present invention advantageously allow video coverage of, for example, sports events to be captured by a high definition camera and then processed so as to form 3D images. Accordingly, embodiments of the invention can derive an offset amount for each detected object within a scene based on a detected distance between a reference position (such as the position of the camera) and the object. When the captured image (e.g. left-hand image) and the modified image (e.g. right-hand image) are viewed together as a pair of images on a display, the object will appear to be positioned at a predetermined distance from the display. This advantageously allows 3D images to be generated without the need for expensive stereo pairs of cameras or time consuming post-processing operations.

Furthermore, by displacing the position of an object within a modified image with respect to a detected position of the object within the captured image by an offset amount which is dependent upon a distance determined by the workstation from data such as image data or distance data, 3D images may be generated from 2D video footage substantially in real time. The term "substantially" is intended to not only capture real-time and almost real-time, but also within a defined period of time such as, in embodiments, less than the duration of the sports event or any period within that sports event, for example a half of a soccer match or a quarter in a game of American Football.

Various further aspects and features of the present invention are defined in the to appended claims.

BRIEF DESCRIPTION OF THE DRAWINGS

The above and other objects and features and advantages of the invention will be apparent from the following detailed description of illustrative embodiments which is to be read in connection with the accompanying drawings, in which.

DESCRIPTION OF THE PREFERRED EMBODIMENTS

An image processing device and image processing method are disclosed. In the following description, a number of specific details are presented in order to provide a thorough understanding of embodiments of the present invention. It will be apparent however to a person skilled in the art that these specific details need not be employed to practice the present invention. Conversely, specific details known to the person skilled in the art are omitted for the purposes of clarity in presenting the embodiments.

Figure 1:
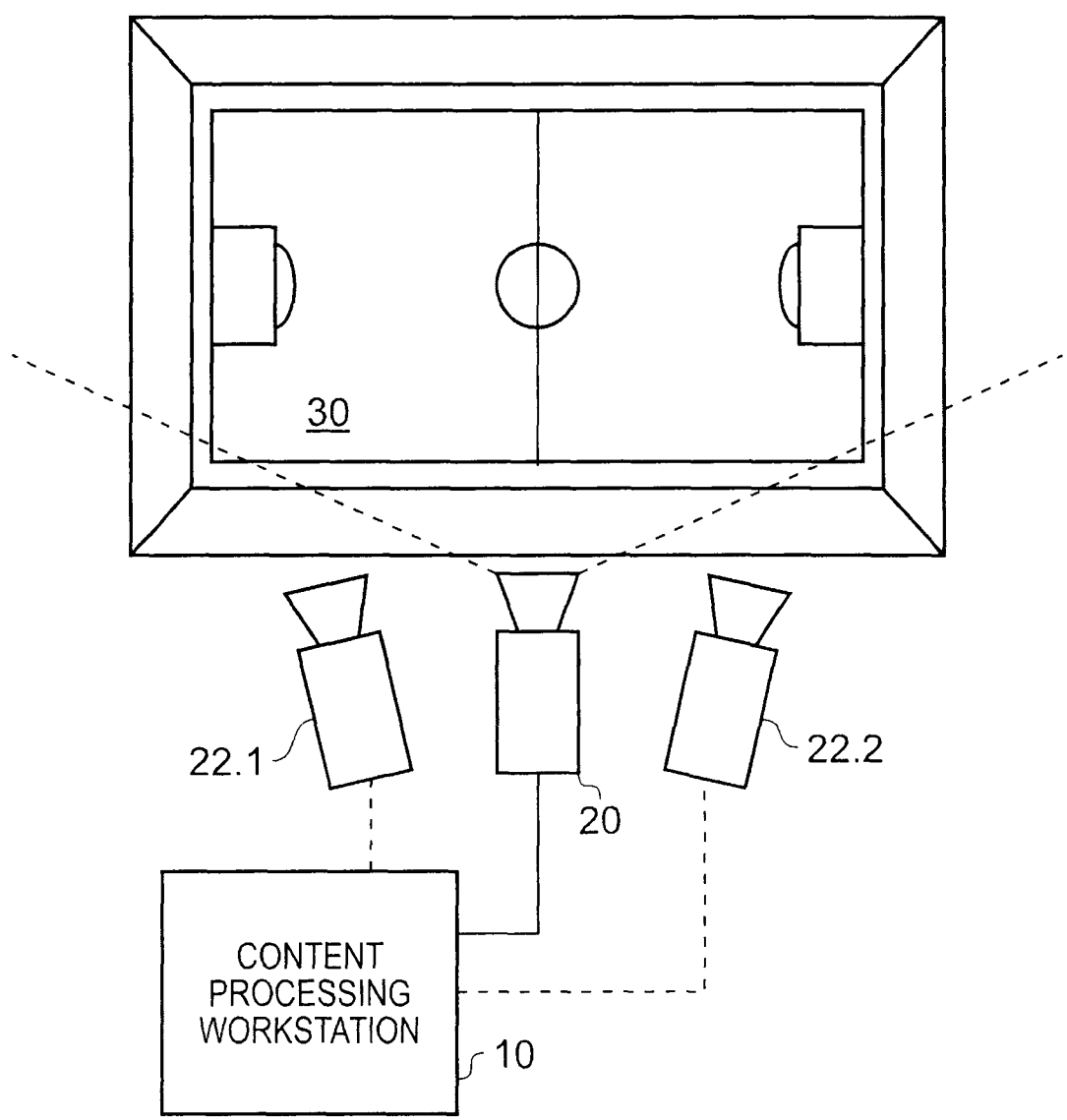
FIG. 1 is a schematic diagram of an object tracking system in accordance with an example of the present invention.

FIG. 1 shows a schematic diagram of an object tracking system in accordance with examples of the present invention. In the example shown in FIG. 1, the objects to be tracked are football players (not shown) on a football pitch 30. High definition (HD) video images (1920 by 1080 pixels) of the pitch 30 are captured by one or more high definition cameras. Although, examples of the present invention can be used to track objects in video images from more than one camera, in some examples only a single camera is used. As will be appreciated, HD cameras are expensive, so that using only a single camera can reduce an amount of expense required to implement systems which utilise the present technique. However, using only a single camera provides only a single two dimensional view of a scene within which the objects are disposed. As a result tracking of the objects within the scene represented by the video images can be more difficult, because occlusion events, in which one object obscures another are more likely. Such a single camera 20 example is shown in FIG. 1, although as illustrated by camera 22.1, 22.2 optionally two cameras can be used, each pointing at a different half of the football pitch.

In FIG. 1, a video camera 20 is disposed at a fixed point within the football stadium and arranged to communicate signals representing video images captured by the camera 20 to a content processing workstation 10, which carries out image processing and other operations so as to track the position of the players on the pitch with respect to time. Data representing the position of the players with respect to time is then logged so that metadata and match statistics can be generated such as the length of time a particular player spent in a particular part of the pitch, how far each player ran and the like. The data representing the position of the players with respect to time forms path data for each player, which relates to the path that each player has taken within the video images. The path data is generated with respect to a three dimensional model of the football pitch (object plane) in order to provide information associated with movement of the players with respect to their position on the pitch, which is not readily apparent from the (two dimensional) video images. This generated path data can then be used to enhance a viewing experience for a viewer when footage of the football match is transmitted via a suitable medium to the viewer or to assist a coach when coaching the football team. The tracking of objects such as players on the pitch 30 will be described in more detail below.

In embodiments of the present invention, the content processing workstation 10 uses a Cell processor jointly developed by Sony®, Toshiba® and IBM®. The parallel nature of the Cell processor makes it particularly suitable for carrying out computationally intensive processing tasks such as image processing, image recognition and object tracking. However, a skilled person will appreciate that any suitable workstation and processing unit may be used to implement embodiments of the present invention.

It will be appreciated that the system and method of object tracking according to examples of the present invention need not be limited to tracking players on a football pitch. For example, players of other team sports such as rugby, cricket, American football, ice hockey, basketball and the like could be tracked. Additionally, objects such as balls, ice hockey pucks or vehicles such as racing cars and the like may be tracked in accordance with examples of the present invention.

According to the present technique, the video images, which are generated using the HD video camera 20 are arranged to capture the view of the whole pitch, so that the players on the pitch can be tracked. Thus the whole pitch is captured from a static position of the camera 20, although as mentioned above, more than one camera could be used, in order to capture the whole pitch. In one example, as mentioned above, the two cameras 22.1, 22.2 may be used each of which is directed at different halves of the pitch. In this example, the video images generated by each camera may be stitched together by the content processing workstation 10 as described in United Kingdom Patent Application No. 0624410.7 so as to form ultra high resolution video images. In this example, after undergoing the stitching process, the output from the camera cluster can be thought of as a single ultra-high resolution image.

The advantages of the ultra-high definition arrangement are numerous including the ability to highlight particular features of a player without having to optically zoom and therefore affecting the overall image of the stadium. Furthermore, the automatic tracking of an object is facilitated because the background of the event is static and there is a higher screen resolution of the object to be tracked.

Object tracking in accordance with examples of the present invention will now be described with reference to FIGS. 2, 3 and 4.

Figure 2:
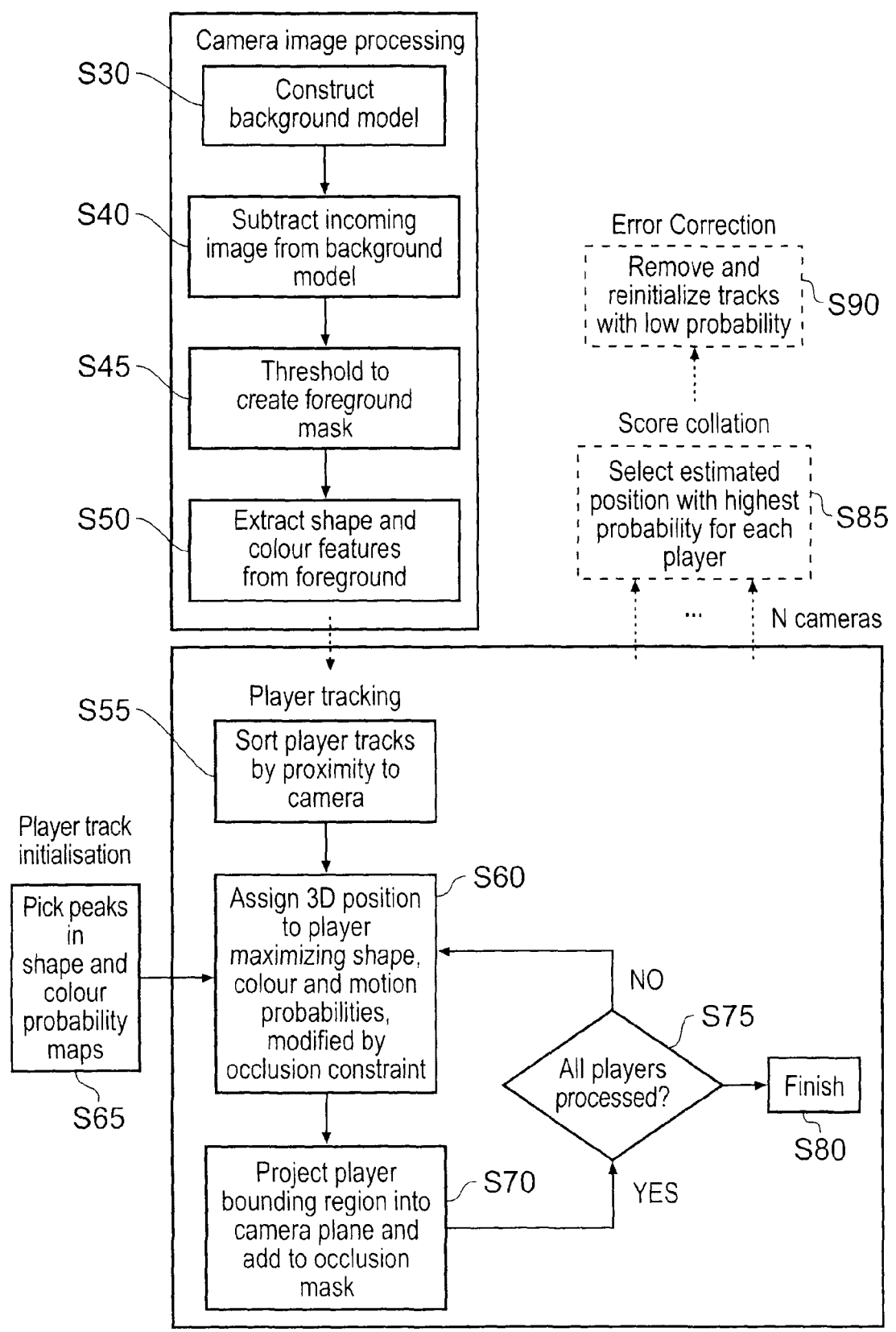
FIG. 2 is a flow diagram of a method of object tracking in accordance with examples of the present invention.

FIG. 2 shows a flowchart of a method of object tracking in accordance with examples of the present invention. In order to track an object, a background model is constructed from those parts of the received video that are detected as being substantially static over a predetermined number of frames. In a first step S30 the video image received from the camera 20, which represents the football pitch is processed to construct the background model of the image. The background model is constructed in order to create a foreground mask which assists in identifying and tracking the individual players. The background model is formed at step S30 by determining for each pixel a mean of the pixels and a variance of the pixel values between successive frames in order to build the background model. Thus, in successive frames where the mean value of the pixels do not change greatly then these pixels can be identified as background pixels in order to identify the foreground mask.

Such a background/foreground segmentation is a process which is known in the field of image processing and the present technique utilises an algorithm described in document by Manzanera and Richefeu, and entitled "A robust and Computationally Efficient Motion Detection Algorithm Based on Σ-Δ Background Estimation", published in proceedings ICVGIP, 2004. However, the present technique should not be taken as being limited to this known technique and other techniques for generating a foreground mask with respect to a background model for use in tracking are also known.

It will be appreciated that, in the case where the field of view of the video camera encompasses some of the crowd, the crowd is unlikely to be included in the background model as they will probably be moving around. This is undesirable because it is likely to increase a processing load on the Cell processor when carrying out the object tracking as well as being unnecessary as most sports broadcasters are unlikely to be interested in tracking people in the crowd.

In an example of the present invention, the background model is constructed at the start of the game and can even be done before players come onto the pitch. Additionally, the background model can be recalculated periodically throughout the game so as to take account of any changes in lighting condition such as shadows that may vary throughout the game.

In step S40, the background model is subtracted from the incoming image from the camera to identify areas of difference. Thus the background model is subtracted from the image and the resultant image is used to generate a mask for each player. In step S45, a threshold is created with respect to the pixel values in a version of the image which results when the background model has been subtracted. The background model is generated by first determining the mean of the pixels over a series of frames of the video images. From the mean values of each of the pixels, the variance of each of the pixels can be calculated from the frames of the video images. The variance of the pixels is then used to determine a threshold value, which will vary for each pixel across all pixels of the video images. For pixels, which correspond to parts of the image, where the variance is high, such as parts which include the crowd, the threshold can be set to a high value, whereas the parts of the image, which correspond to the pitch will have a lower threshold, since the colour and content of the pitch will be consistently the same, apart from the presence of the players. Thus, the threshold will determine whether or not a foreground element is present and therefore a foreground mask can correspondingly be identified. In step S50 a shape probability based on a correlation with a mean human shape model is used to extract a shape within the foreground mask. Furthermore, colour features are extracted from the image in order to create a colour probability mask, in order to identify the player, for example from the colour of the player's shirt. Thus the colour of each team's shirts can be used to differentiate the players from each other. To this end, the content processing workstation 10 generates colour templates in dependence upon the known colours of each football team's team kit. Thus, the colour of the shirts of each team is required, the colour of the goal keeper's shirts and that of the referee. However, it will be appreciated that other suitable colour templates and/or template matching processes could be used.

Returning to FIG. 2, in step S50 the content processing workstation 10 compares each of the pixels of each colour template with the pixels corresponding to the shirt region of the image of the player. The content processing workstation then generates a probability value that indicates a similarity between pixels of the colour template and the selected pixels, to form a colour probability based on distance in hue saturation value (HSV) colour space from team and pitch colour models. In addition, a shape probability is used to localise the players, which is based on correlation with a mean human shape model, Furthermore, a motion probability is based on distance from position predicted by a recursive least-squares estimator using starting position, velocity and acceleration parameters.

Figure 3A:
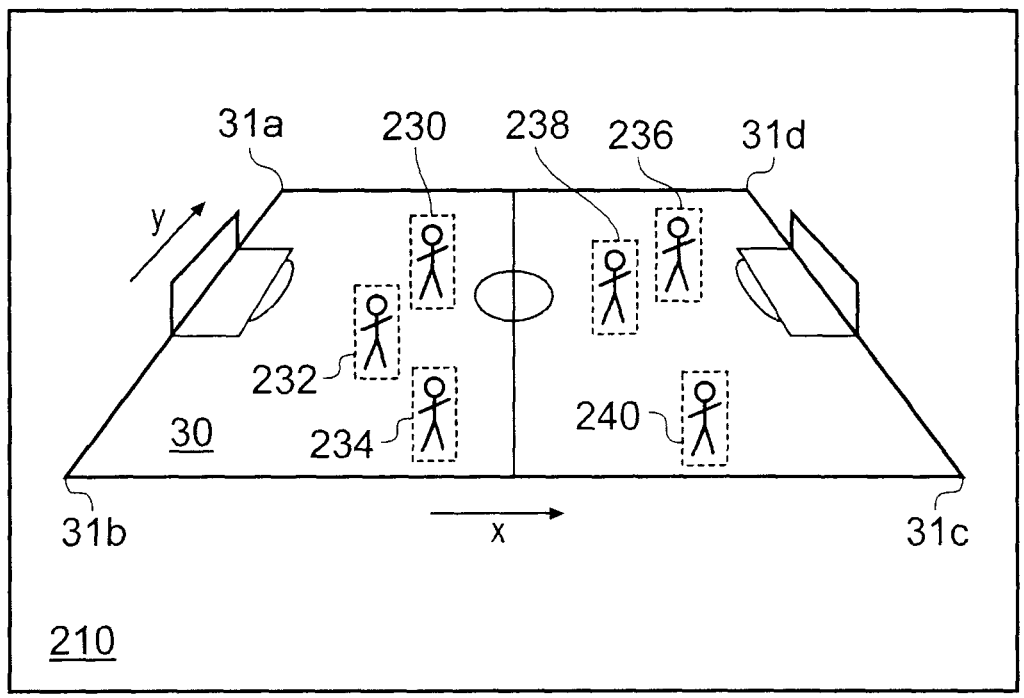
FIGS. 3A and 3B are schematic diagrams of object tracking in accordance with an example of the present invention.

The creation of player masks is illustrated in FIG. 3A. FIG. 3A shows a camera view 210 of the football pitch 30 generated by the video camera 20. As already explained, the pitch 30 forms part of the background model, whilst the players 230, 232, 234, 236, 238, 240 should form part of the foreground mask as described above. Player bounding boxes are shown as the dotted lines around each player.

Thus far the steps S30, S40, S45 and S50 are performed with a respect to the camera image processing. Having devised the foreground mask, player tracking is performed after first sorting the player tracks by proximity to the camera in step S55. Thus, the players which are identified as being closest to the camera are processed first in order to eliminate these players from the tracking process. At step S60, player positions are updated so as to maximise shape, colour and motion probabilities. In step S70 an occlusion mask is constructed that excludes image regions already known to be covered by other closer player tracks. This ensures that players partially or wholly occluded by other players can only be matched to visible image regions. The occlusion mask improves tracking reliability as it reduces the incidence of track merging (whereby two tracks follow the same player after an occlusion event). This is a particular problem when many of the targets look the same, because they cannot be (easily) distinguished by colour. The occlusion mask allows pixels to be assigned to a near player and excluded from the further player, preventing both tracks from matching to the same set of pixels and thus maintaining their separate identities.

Figure 3B:
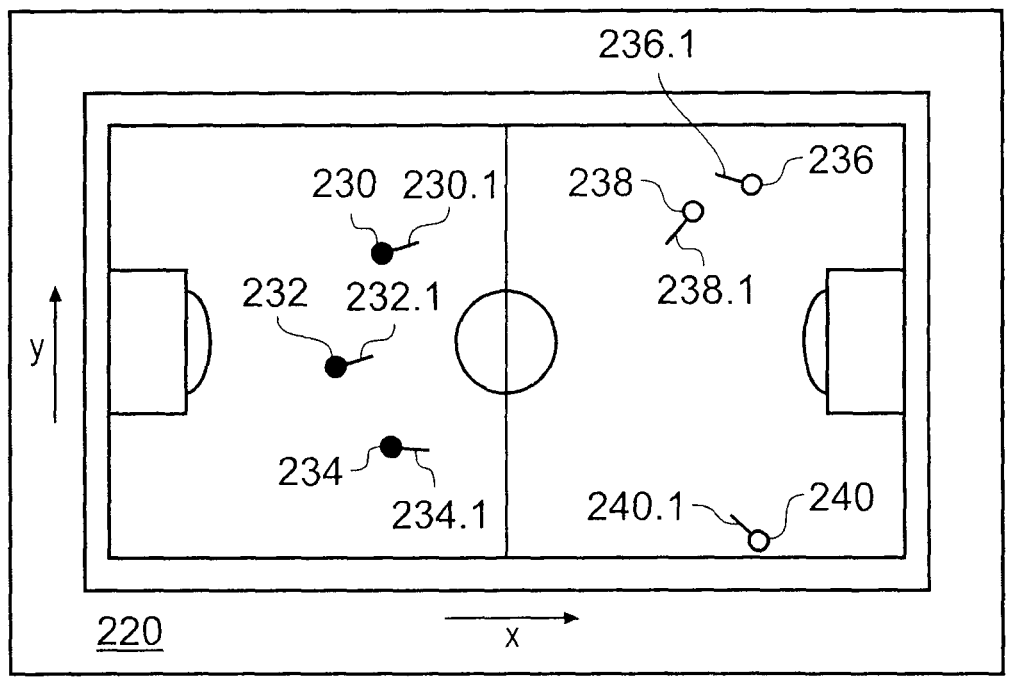

There then follows a process of tracking each player by extracting the features provided within the camera image and mapping these onto a 3D model as shown in FIGS. 3A and 3B. Thus, for corresponding a position within the 2D image produced by the camera, a 3D position is assigned to a player which maximises shape, colour and motion probabilities. As will be explained shortly, the selection and mapping of the player from the 2D image onto the 3D model will be modified should an occlusion event have been detected. To assist the mapping from the 2D image to the 3D model in step S65 the players to be tracked are initialised to the effect that peaks in shape and colour probability are mapped onto the most appropriate selection of players. It should be emphasised that the initialisation, which is performed at step S65 is only performed once, typically at the start of the tracking process. For a good initialisation of the system, the players should be well separated. After initialisation any errors in the tracking of the players are corrected automatically in accordance with the present technique, which does not require manual intervention.

In order to effect tracking in the 3D model from the 2D image positions, a transformation is effected by use of a projection matrix P. Tracking requires that 2D image positions can be related to positions within the 3D model. This transformation is accomplished by use of a projection (P) matrix. A point in 2D space equates to a line in 3D space:

$$\begin{bmatrix} x \\ y \\ 1 \end{bmatrix} = \begin{bmatrix} P_{00} & P_{01} & P_{02} & P_{03} \\ P_{10} & P_{11} & P_{12} & P_{13} \\ P_{20} & P_{21} & P_{22} & P_{23} \\ 0 & 0 & 0 & 1 \end{bmatrix} \begin{bmatrix} x' \\ y' \\ z' \\ w \end{bmatrix}$$

A point in a 2D space equates to a line in a 3D space because a third dimension, which is distance from the camera, is not known and therefore would appear correspondingly as a line across the 3D model. A height of the objects (players) can be used to determined the distance from the camera. A point in 3D space is gained by selecting a point along the line that lies at a fixed height above the known ground level (the mean human height). The projection matrix P is obtained a priori, once per camera before the match by a camera calibration process in which physical characteristics of the pitch such as the corners 31a, 31b, 31c, 31d of the pitch 30 are used to determine the camera parameters, which can therefore assist in mapping the 2D position of the players which have been identified onto the 3D model. This is a known technique, using established methods. In terms of physical parameters, the projection matrix P incorporates the camera's zoom level, focal centre, 3D position and 3D rotation vector (where it is pointing).

The tracking algorithm performed in step S60 is scalable and can operate on one or more cameras, requiring only that all points on the pitch are visible from at least one camera (at a sufficient resolution).

In addition to the colour and shape matching, step S60 includes a process in which the motion of the player being tracked is also included in order to correctly identify each of the players with a greater probability. Thus the relevant movement of players between frames can be determined both in terms of a relevant movement and in a direction. Thus, the relative motion can be used for subsequent frames to produce a search region to identify a particular player. Furthermore, as illustrated in FIG. 3B, the 3D model of the football pitch can be augmented with lines 230.1, 232.1, 234.1, 236.1, 238.1, 240.1 which are positioned relative to the graphic indication of the position of the players to reflect the relative direction of motion of the players on the football pitch.

At step S70, once the relative position of the players has been identified in the 3D model then this position is correspondingly projected back into the 2D image view of the football pitch and a relative bound is projected around the player identified from its position in the 3D model. Also at step S70, the relative bound around the player is then added to the occlusion mask for that player.

FIG. 3B shows a plan view of a virtual model 220 of the football pitch. In the example shown in FIG. 3B, the players 230, 232, and 234 (on the left hand side of the pitch) have been identified by the content processing workstation 10 as wearing a different coloured football shirt from the players 236, 238, and 240 (on the right hand side of the pitch) thus indicating that they are on different teams. Differentiating the players in this way makes the detection of each player after an occlusion event easier as they can easily be distinguished from each other by the colour of their clothes.

Referring back to FIG. 2, at a step s60, the position of each player is tracked using known techniques such as Kalman filtering, although it will be appreciated that other suitable techniques may be used. This tracking takes place both in the camera view 210 and the virtual model 220. In an example of the present invention, velocity prediction carried out by the content processing workstation 10 using the position of the players in the virtual model 220 is used to assist the tracking of each player in the camera view 210.

Steps S60 and S70 are repeated until all players have been processed as represented by the decision box S75. Thus, if not all players have been processed then processing proceeds to step S60 whereas if processing has finished then the processing terminates at S80.

As shown in FIG. 2, the method illustrated includes a further step S85, which may be required if images are produced by more than one camera. As such, the process steps S30 to S80 may be performed for the video images from each camera. As such, each of the players will be provided with a detection probability from each camera. Therefore, according to step S85, each of the player's positions is estimated in accordance with the probability for each player from each camera, and the position of the player estimated from the highest of the probabilities provided by each camera, so that the position with the highest probability for each player is identified as the location for that player.

If it has been determined that an error has occurred in the tracking of the players on the football pitch then the track for that player can be re-initialised in step S90. The detection of an error in tracking is produced where a probability of detection of a particular player is relatively low for a particular track and accordingly, the track is re-initialised.

A result of performing the method illustrated in FIG. 2 is to generate path data for each player, which provides a position of the player in each frame of the video image, which represents a path that that player takes throughout the match. Thus the path data provides position with respect to time.

Figure 4:
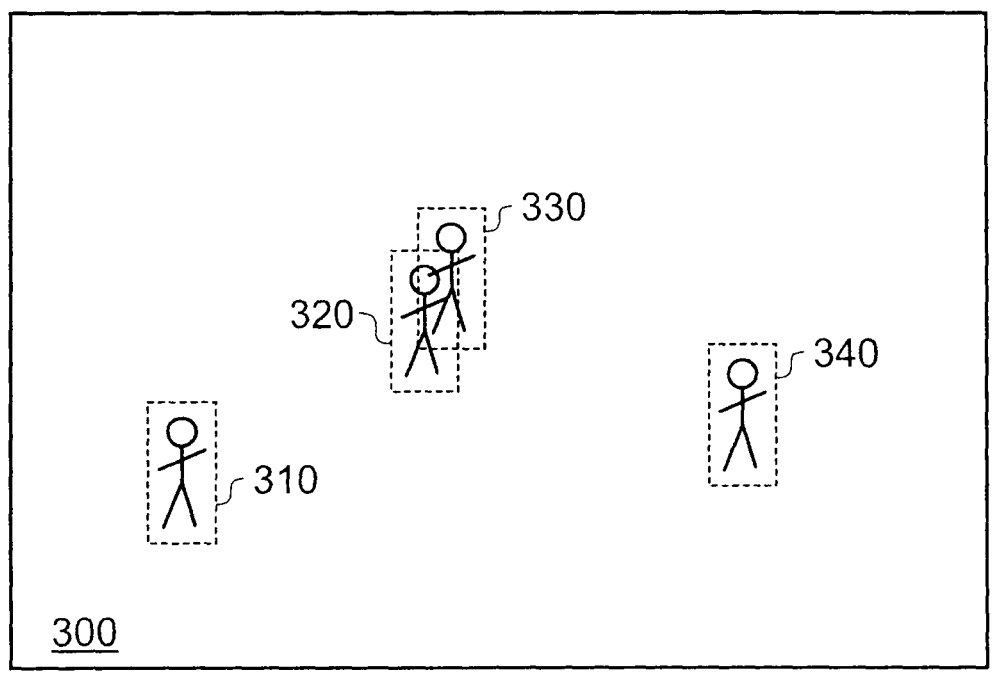
FIG. 4 is a schematic diagram of occlusion detection in accordance with an example of the present invention.

A problem may arise when tracking the position of each player form a single camera view if one player obscures a whole or part of another player as illustrated in FIG. 4.

FIG. 4 shows a plurality of players 310, 320, 330, and 340 and their associated bounding boxes as indicated by the dashed lines around each player. Whilst the players 310 and 340 are clearly distinguishable from each other, player 320 obscures part of player 330. This is a so called occlusion event. An occlusion event can occur when all or part of one player obscures all or part of at least one other player with the effect that the tracking of the players becomes ambiguous, even after other factors, such as a relative motion and direction of the players is taken into account. However, it will be appreciated that occlusion events in which two or more players are involved may occur.

To detect an occlusion event, the content processing workstation 10 detects whether all or part of a mask associated with a player occurs in the same image region as all or part of a mask associated with another player as shown in FIG. 4. In the case where players involved in an occlusion event are on opposing teams and thus have different coloured shirts, they may easily be distinguished and tracked accordingly. However, after the occlusion event, if the players are both on the same side, the content processing workstation 10 may not be able to distinguish which player is which, particularly because their motion after an occlusion event, which was caused for example by a collision, may not be predictable and therefore may not track the players correctly. As a result, a tracking path assigned to each player may become swapped.

In order to resolve an ambiguity in the players tracked, the content processing workstation 10 labels all players involved in the occlusion event with the identities of all those players involved in the occlusion event. Then, at a later time, if one or more of the players become easily distinguishable, the content processing workstation 10 uses this information to reassign the identities of the players to the correct players so as to maintain a record of which player was which. This process is described in more detail with reference to FIG. 5.

Figure 5:
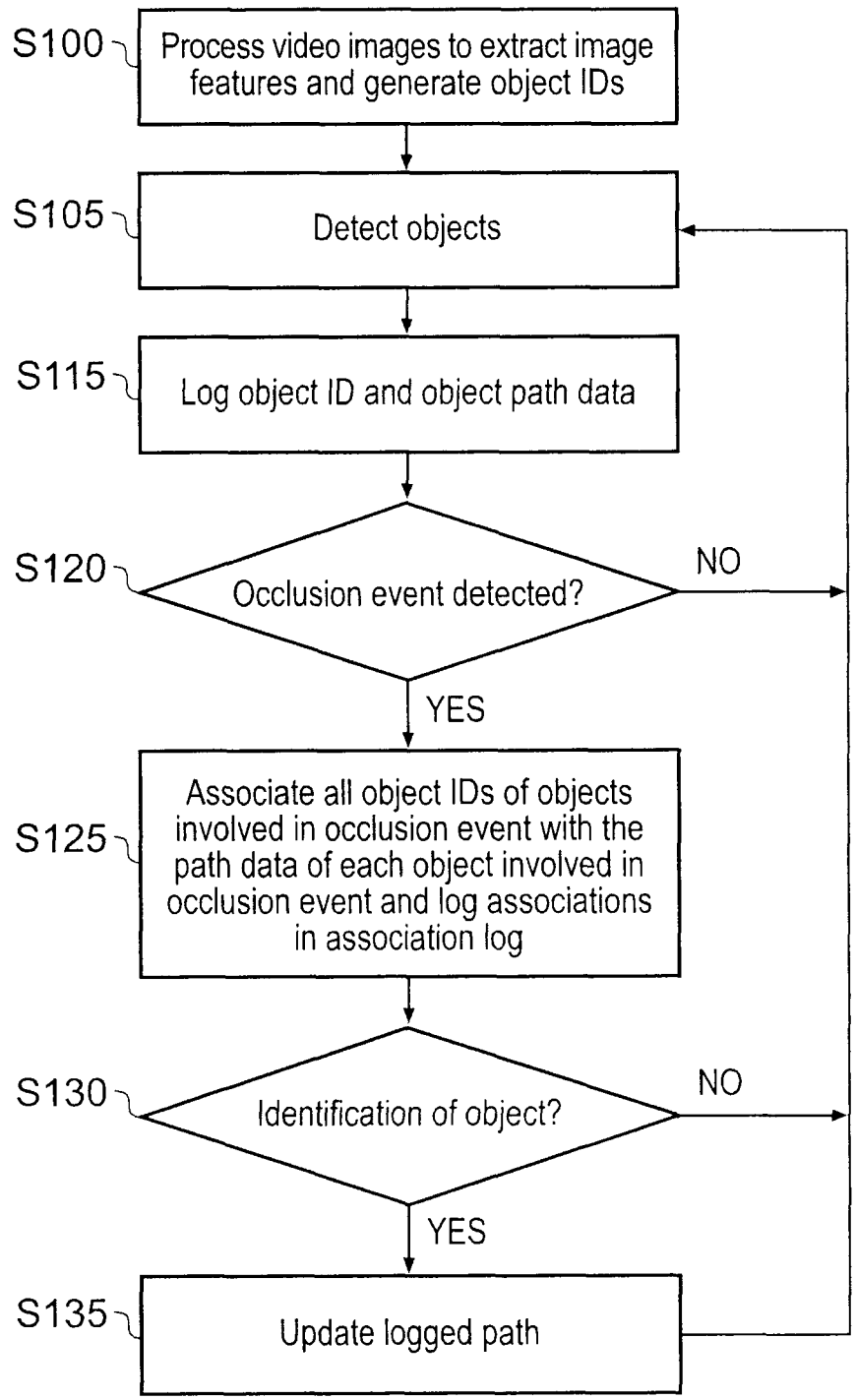
FIG. 5 is a flow diagram of a method of object tracking and occlusion detection in accordance with an example of the present invention.

FIG. 5 shows a flow diagram of a method of object tracking and occlusion detection in accordance with examples of the present invention.

At a step s100, the content processing workstation carries out image processing on the captured video images so as to extract one or more images features as described above with reference to FIG. 2 above. The extracted image features are then compared with corresponding image features that are extracted from possible examples of the objects so as to identify each object. In an example of the present invention, players are identified from the number on the shirt as will be described in more detail below with reference to FIGS. 7 and 8. The content processing workstation then generates object identification for each object which identifies each object. Alternatively, in an example of the present invention, each object (e.g. a player) is identified by an operator via an operator interface. The content processing workstation 10 then uses the data input from the operator interface to generate the object identification data. However, it will be appreciated by the skilled person that image recognition techniques could be combined with identification by the operator so as to generate the object identification data or that other suitable object identification methods could be used, such as number recognition, which identifies the players by the numbers on the back of their shirts.

At a step s105, the content processing workstation 10 detects any objects to be detected such as the players as described with reference to FIG. 2 above in dependence upon the one or more image features extracted at the step s100. As was mentioned above, each player is also tracked using both the virtual model 220 and the camera view 210. The content processing workstation 10 uses the data generated during the tracking process to generate and store object path data that describes the path that each object takes within the received video images. The object path data takes the form of a sample of the x-y coordinates of the player with respect to time. In an example of the present invention, the path data has the format $(t_i, x_i, y_i)$, where $t_i$ is the sample time, and $x_i$ and $y_i$ are the x and y coordinates of the object at the sample time $t_i$. However, it will be appreciated that other suitable path data formats could be used.

At the step s115, the content processing workstation 10 logs the object identification data for each object together with object path data which relates to the path that each object has taken within the video images. The logged data is stored on a hard disk drive (HDD) or in dynamic random access memory (DRAM) of the content processing workstation 10. This allows a record to be kept of which player was associated with each detected and tracked path. The logged data can then be used to generate data about each player and where they were during the match. For example, the time that a player spent in a particular area of the pitch could be generated from the data stored in the association log. Furthermore, if for any reason the association between the player and the path becomes ambiguous, for example as might happen after an occlusion event, a record of this can be kept until the ambiguity is resolved as described below. An example of the logged object identification data together with the object path data is shown in Table 1 below.

TABLE 1

| ObjectID | t | x | y |
|---|---|---|---|
| A | $t_1$ | $x_1$ | $y_1$ |
| A | $t_2$ | $x_2$ | $y_2$ |
| A | $t_3$ | $x_3$ | $y_3$ |
| M | M | M | M |
| A | $t_i$ | $x_i$ | $y_i$ |

The association between the object identification data for each object and the object path data for that object allows each object to be tracked and identified accordingly. In the examples described above, each player may be tracked, therefore allowing a broadcaster to know which player is which even though that player might be too far away to be visually identified by an operator or by image recognition carried out by the content processing workstation 10. This allows a broadcaster to incorporate further features and information based on this association that a viewer of the broadcast content might find desirable. At a step s120, the content processing workstation 10 detects whether an occlusion event has occurred as described above with reference to FIG. 4. If no occlusion event is detected, then the process returns to the step s105 in which the objects are detected. In this way each object can be individually tracked and the path of each object uniquely associated with the identity of that object.

However, if an occlusion event is detected, then, at a step s125, the Cell processor associates the object identification data for each object involved in the occlusion event with the object path data for each object involved in the occlusion event. For example, if two objects labelled A and B are associated with paths P and Q respectively, after the detection of an occlusion event involving objects A and B, the path P will be associated with both A and B and the path Q will be associated with both A and B. The associations generated by the content processing workstation 10 after the occlusion event are then logged as described above. This allows the objects (e.g. players) involved in the occlusion event to be tracked without having to re-identify each object even if there is some uncertainty as to which player is which. Therefore, a processing load on the content processing workstation 10 is reduced as only those objects involved in the occlusion event are identified ambiguously, whilst objects not involved in the occlusion event can still be identified.

At a step s130, the content processing workstation 10 checks to see if an identification of one or more of the objects involved in the occlusion event has been made so that the identity of the objects associated with the generated paths can be resolved. The identification of at least one of the objects is carried out by the content processing workstation by comparing one or more image features associated with that object with the image features extracted from the possible examples of the objects. If no identification has been made, then the process passes to the step s105 with the generated path data for each object being associated with all those objects involved in the occlusion event.

However, if an identification of one or more of the objects involved in the occlusion event is detected to have occurred, then at a step s135, the logged path data is updated to reflect the identity of the object that was positively identified. In the example given above, the association log would be updated so that A is associated with path P, and B is associated with path Q.

Alternatively, an identification of an object may be carried out by an operator via an operator interface, by the content processing workstation 10 using image recognition techniques in accordance with examples of the present invention (as described below) or by a combination of the two techniques. However, it will be appreciated that any other identification technique suitable to distinguish or identify each object could be used. In the case of image recognition the content processing workstation 10 may generate a confidence level that indicates how likely the identification made by the image recognition process is to be correct. In an example of the present invention, an identification is determined to be where the confidence level is greater than a predetermined threshold. Additionally, an operator may assign a confidence level to their identification and, if that confidence level exceeds a predetermined threshold, then an identification is detected.

In examples of the present invention, a history of events is generated indicating when the logged path data has been updated and this may also be stored so as to act as back-up in case the positive identification turns out to be incorrect. For example, an identification could turn out to be incorrect where an operator was convinced that a player that was far away from the video camera 20 had a particular identity but as the player came closer to the video camera (allowing the user to see a higher resolution image of the player), the operator realises they have been mistaken. In this case, they may use the operator interface to over-ride their previous identification of the player so as that the content processing workstation 10 can update the logged path data accordingly. In the example given above, an identification event history can be stored on a hard disk drive (HDD) or in dynamic random access memory (DRAM) of the content processing workstation 10 with data showing that, before the positive identification, the path P used to be associated with both A and B and the path Q used to be associated with both A and B.

The identification event history can also include the confidence level that was generated during the identification process. If a subsequent identification is made of an object that has a higher confidence level than that of a previous positive identification, then the confidence level of the subsequent identification can be used to verify or annul the previous identification.

It will be appreciated that after the detection of an occlusion event, an object may be identified at any time after the occlusion event so as to disambiguate the objects involved in the occlusion event. Therefore, after the detection of an occlusion event, the content processing workstation 10 can monitor whether a positive identification of an object has occurred as a background process that runs concurrently with the steps s105 to s125.

Some examples of object tracking and occlusion detection in accordance with examples of the present invention will now be described with reference to FIGS. 6a and 6b.

Figure 6A:
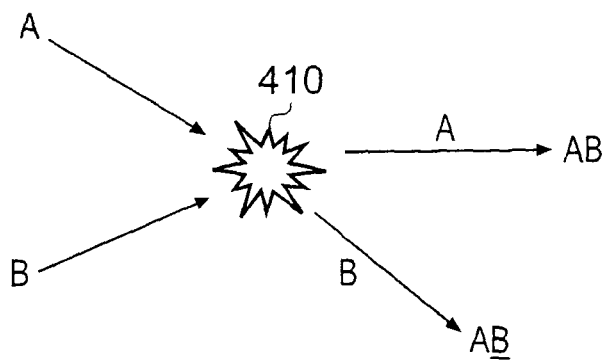
FIGS. 6A and 6B are schematic diagrams of object tracking and occlusion detection in accordance with an example of the present invention.

In the example shown in FIG. 6a, two objects identified as A and B are involved in an occlusion event 410. After the occlusion event both detected object paths as indicated by the arrows are associated with both A and B (AB). Some time later, object B is positively identified as indicated by AB on the lower path. This identification is then used to update the association between the object and the paths so that object A is associated with the upper path after the occlusion event 410 and object B is associated with the lower path after the occlusion event 410.

Figure 6B:
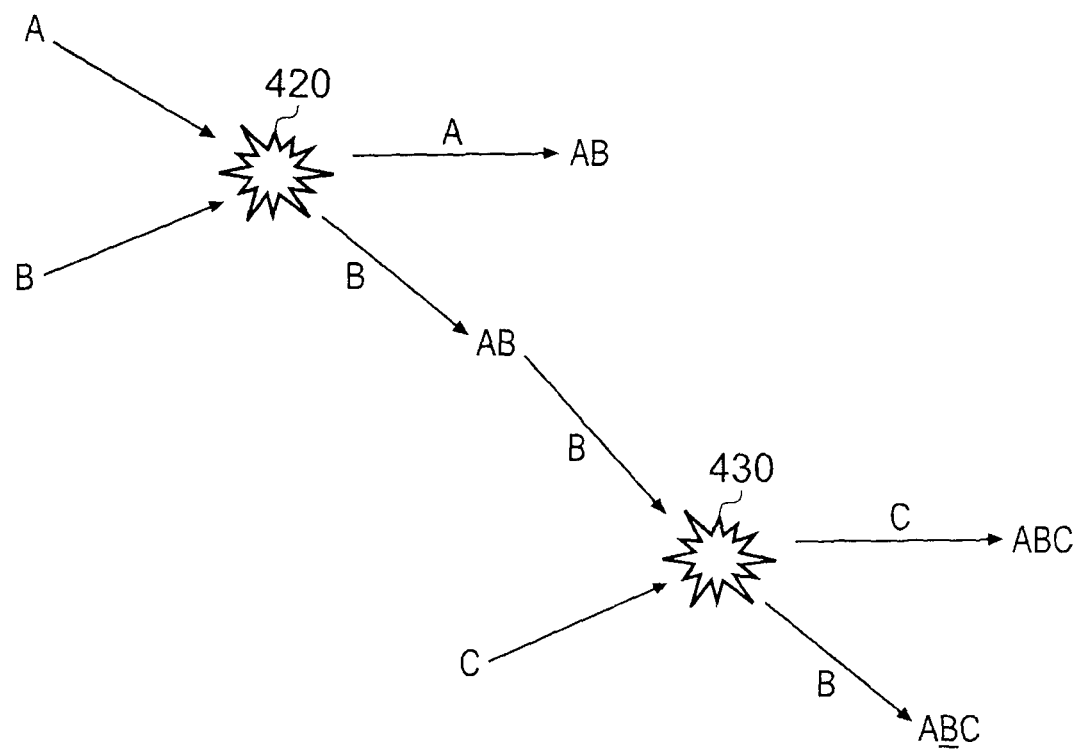

In the example shown in FIG. 6b, objects A and B are initially involved in an occlusion event 420. However, before the objects A and B can be positively identified, the object associated with both A and B on the lower path after the occlusion event 420 is involved in another occlusion event 430 with object C. Accordingly, before the occlusion event 430, it is unclear whether the object on the lower path after the occlusion event 420 is object A or object B. Therefore, after the occlusion event 430, both the upper and lower paths that the two objects follow are associated with the objects A, B and C (ABC).

At a later time, the object on the lower path after occlusion event 430 is positively identified as being object B (ABC). Therefore, association log can be updated so that the upper path after occlusion event 430 is associated with object C. Furthermore, this information can be used to update the association log so that the two objects involved in the occlusion event 420 can be disambiguated as it must have been object B that was involved in the occlusion event 430 as object B was positively identified as being associated with the lower path after occlusion event 430. Accordingly, the association log can be updated so that the upper path after the occlusion event 420 is associated with the object A and the lower path after occlusion event 420 associated with object B.

Therefore, examples of the present invention allow objects to be associated with tracked paths of objects even though several occlusion events may have occurred before an object is positively identified. Furthermore, examples of the present invention allow the identities of the different objects to be cross referenced with each other so as to allow each path to be associated with the correct object.

In some examples, data representing the starting position of objects may be used to initialise and verify the object tracking. Taking soccer as an example, players are likely to start a match in approximately stationary positions on the field of play. Each player is likely to be positioned within a threshold distance from a particular co-ordinate on the field of play. The starting positions may depend on the team formation such as 4-4-2 (four in defence, four in midfield, two in attack) or 5-3-2, and also which team is kicking off and which team is defending the kick-off. Similar positions are likely to be adopted by players from a goal-kick taken from the ground. Such position information can be used to initiate player tracking, for example by comparing position data with a team-sheet and formation information. Such position information may also be used to correct the path information when an occlusion event has occurred. Using the team formation information is advantageous because this can be reset by an operator during the course of a match should changes in team formation become apparent, e.g. after a substitution or a sending off. This will improve the accuracy and reliability of the object tracking.

Embodiments of the present invention in which an image captured by the camera 20 is used to generate a modified image so that the captured image and the modified image can be viewed together so as to appear to a user as a three-dimensional image will now be described with reference to FIGS. 7a to 7d and FIGS. 8 to 12.

FIGS. 7a to 7d show examples of a display arrangement for displaying images to a user such that an object may appear to be positioned at a distance from a display. By using appropriate glasses, such as those having differently coloured or polarised lenses for each eye, a user may view displayed images such that images intended for viewing by their left eye and images intended for their right eye are viewed correctly so as to provide a three-dimensional viewing experience for the user.

In order to create an illusion that an object is three-dimensional, an image intended for the left eye may be shifted or displaced with respect to an image intended for the right eye by a displacement amount which depends on the distance between the user and the display, the user's interpupillary distance (IPD), which is the distance between the user's pupils when the user is focussing their eyes at infinity, and a desired distance from the screen at which an object is intended to be positioned. The apparent distance between the user and a rendered object is referred to herein as apparent object depth.

The way in which the offset amount may be calculated is described in detail below with reference to FIGS. 7a to 7d. In embodiments of the invention, the offset amount is applied with respect to the image intended for the left eye (the left-hand image), although it will be appreciated that the offset amount could be applied with respect to the right-hand image intended for the right eye.

Figure 7A:
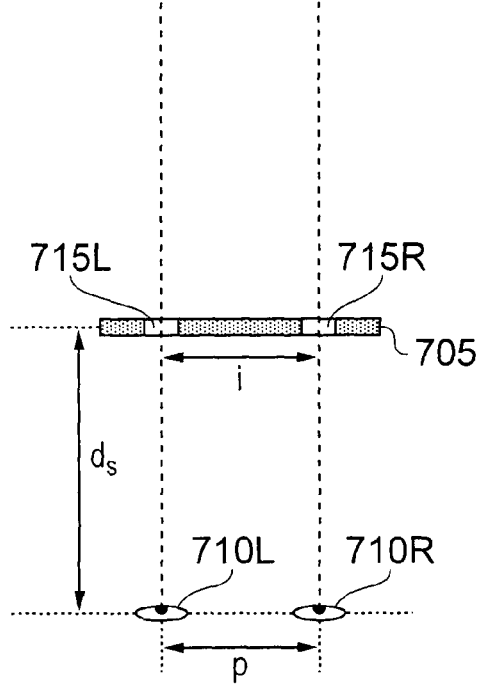
FIGS. 7a to 7d show schematic diagrams of examples of a display arrangement for displaying 3D images to a user such that an object may appear to be positioned at a distance from a display.

FIG. 7a schematically shows a display 705 together with illustrations of a user's left eye 710L and right eye 710R. The distance between the user's eyes and the display 705 is labelled as $d_s$, and the interpupillary distance is labelled as p in FIGS. 7a to 7d. FIG. 7a also illustrates positions on the display at which image features corresponding to an object are to be displayed so as to provide a 3D effect. In particular a left-hand image 715L intended for viewing by the user's left eye 710L, and a right-hand image 715R intended for viewing by the user's right eye 710R are illustrated with respect to the display 705. The offset amount between the left-hand image 715L and the right-hand image 715R is indicated as i in FIGS. 7a to 7d.

Figure 7B:
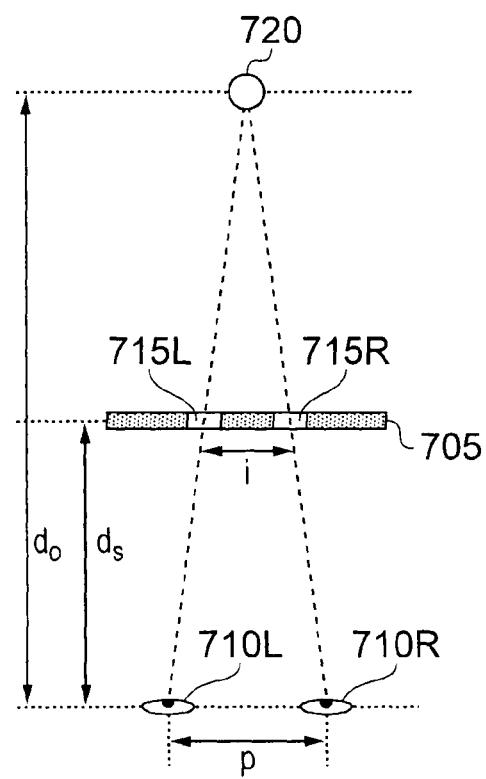

In FIG. 7a, the positions of the left-hand image 715L and the right-hand image 715R are such that the offset amount is the same as the interpupillary distance p (IPD), and therefore the object will appear as if it is at an infinite distance from the display 705, as indicated by the parallel dashed lines in FIG. 7a. However, in order to make the object appear at a finite distance from the display 705, the offset amount should be less than the distance between the user's pupils (interpupillary distance p). This is illustrated in FIG. 7b. Typically, the interpupillary distance is 52 mm to 70 mm although it may vary depending on sex, ethnicity, age, and the like.

FIG. 7b shows a example where the offset amount i is less than the distance p between the user's eyes, and therefore an object 720 will appear as if the object 720 is at a distance $d_O$ from the user's eyes. The offset amount i can be calculated from equation 1 shown below.

$$\left(\frac{d_o - d_s}{d_o}\right) \times p = i \qquad \text{Equation 1}$$

In equation 1, $d_O$ is the apparent object depth, $d_S$ is the distance between the user's eyes 710L 710R and the display 705, p is the distance between the user's pupils (interpupillary distance), and i is the offset amount.

Figure 7C:
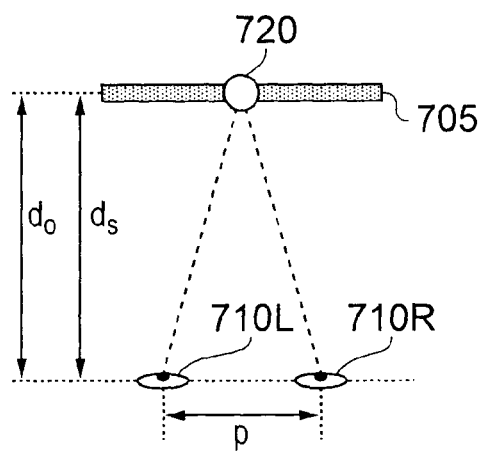

If the object 720 is to appear as if displayed on the display 705 at the position of the display (in other words $d_O=d_S$), then the offset amount i will be zero. This situation is illustrated in FIG. 7c.

Figure 7D:
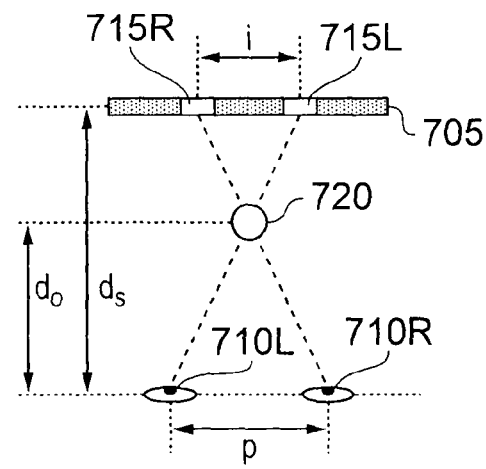

If the object is to appear as if positioned between the display 705 and the user (in other words $d_O<d_S$), then the offset amount with respect to the left-hand image 715L should be negative, as illustrated in FIG. 7d. In other words, the right-hand image 715R would appear to the user to be to the left of the left-hand image 715L, thus causing the user's eyes to converge and focus at a position between the user and the display 705.

In embodiments, to reduce discomfort and eye fatigue for the user, the offset amount should be the same as, or less than, the interpupillary distance ($i \leq P$). Additionally, to reduce eye fatigue and discomfort for the user, the ratio of the apparent distance to the object $d_O$ with respect to the distance to the display $d_S$ should be greater than a predetermined amount, typically 0.2. In other words, in some embodiments, $d_O/d_S \geq 0.2$, so as to try to reduce eye discomfort for the user. However, it will be appreciated that other suitable values could be used.

Embodiments of the present invention in which a distance between a camera and an object within an image captured by the camera is used to determine the offset amount will now be described with reference to FIGS. 8 to 12.

Figure 8:
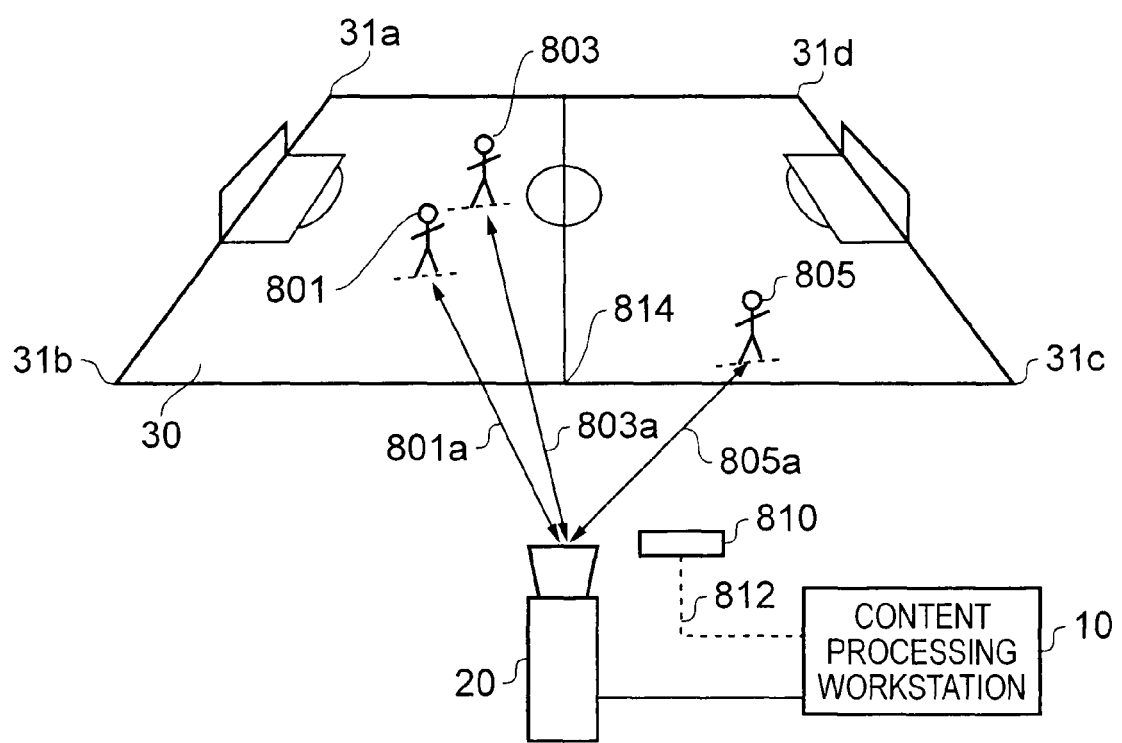
FIG. 8 is a schematic diagram of a system for determining the distance between a camera and objects within a field of view of the camera in accordance with embodiments of the present invention.

FIG. 8 is a schematic diagram of a system for determining the distance between a position of the camera and objects within a field of view of the camera in accordance with embodiments of the present invention.

The system shown in FIG. 8 is similar to the one described above with respect to FIG. 1. In particular, FIG. 8 shows the content processing workstation arranged to communicate with the camera 20, which captures images of the pitch 30. As described above, the content processing workstation 10 is operable to analyse the images captured by the camera 20 so as to track players on the pitch 30, and determine their position on the pitch 30. In some embodiments, the system comprises a distance detector 810 operable to detect a distance between the camera 20 and objects within the field of view of the camera. The distance detector 810 and its operation will described in more detail later below.

In some embodiments, the content processing workstation can use the tracking data and position data to determine a distance between a position of the camera 20 and players on the pitch. For example, the content processing workstation can analyse the captured image so as to determine a distance 801a between a position of the camera 20 and a player 801, a distance 803a between the position of the camera 20 and a player 803, and a distance 805a between the position of the camera 20 and a player 805.

In other words, embodiments of the invention determine the distance between the object within the scene and a reference position defined with respect to the camera. In the embodiments described with reference to FIG. 8, the reference position is located at the position of the camera.

Additionally, in some embodiments, the workstation 10 is operable to detect predetermined image features within the captured image which correspond to known feature points within the scene. For example, the workstation can analyse the captured image using known techniques so as to detect image features which correspond to features of the football pitch such as corners, centre spot, penalty area and the like. Based on the detected positions of the detected known feature points (image features), the workstation 10 can then map the three dimensional model of the pitch 30 to the captured image using known techniques. Accordingly, the workstation 10 can then analyse the captured image to detect the distance between the camera and the player in dependence upon the detected position of the player with respect to the 3D model which has been mapped to the captured image.

In some embodiments of the invention, the content processing workstation 10 can analyse the captured images so as to determine a position at which the player's feet are in contact with the pitch. In other words, the workstation 10 can determine an intersection point at which an object, such as a player, coincides with a planar surface such as the pitch 30.

Where an object is detected as coinciding with the planar surface at more than one intersection point (for example both of the player's feet are in contact with the pitch 30), then the workstation 10 is operable to detect which intersection point is closest to the camera 20 and use that distance for generating the offset amount. Alternatively, an average distance of all detected intersection points for that object can be calculated and used when generating the offset amount. However, it will be appreciated that other suitable intersection points could be selected, such as an intersection point furthest from the camera 20.

However, in some situations, the method of determining the distance between position of the camera 20 and the object within the scene as described above may cause distortions in the appearance of the three-dimensional image. Such distortions may be particularly apparent if the image is captured by a very wide angle camera or formed by stitching together images captured by two high definition cameras such as the camera 22.1 and the camera 22.2.

For example, image distortions in the three-dimensional image may occur if the pitch 30 is to be displayed as a three-dimensional images upon which the players and the ball are superimposed. In this case, corners 31b and 31c will appear further away than a centre point 814 on the sideline closest to the camera 20. The sideline may thus appear curved, even though the sideline is straight in the captured image.

This effect can be particularly apparent when the three-dimensional image is viewed on a relatively small display such as a computer monitor. If the three-dimensional image is viewed on a comparatively large screen such as a cinema screen, this effect is less obvious because the corners 31b and 31c are more likely to be in the viewer's peripheral vision. The way in which the pitch may be displayed as a three-dimensional image will be described in more detail later below.

A possible way to address this problem would be to generate an appropriate offset amount for each part of the image so as to compensate for the distortion. However, this can be computationally intensive, as well as being dependent on several physical parameters such as degree of distortion due to wide angle image, display size and the like.

Therefore, to reduce distortion in the three-dimensional image and to try to ensure that the front of the pitch (i.e. the sideline closest to the camera) appears at a constant depth from the display, especially when the three-dimensional image is to be viewed on a relatively small display such as a computer monitor or television screen, embodiments of the invention determine the distance between the object and a reference position which lies on a reference line. The reference line is orthogonal to the optical axis of the camera and passes through a position of the camera, and the reference position is located on the reference line at a point where an object location line and the reference line intersect. The object location line is orthogonal to the reference line and passes through the object. This will be described below with reference to FIG. 9.

Figure 9:
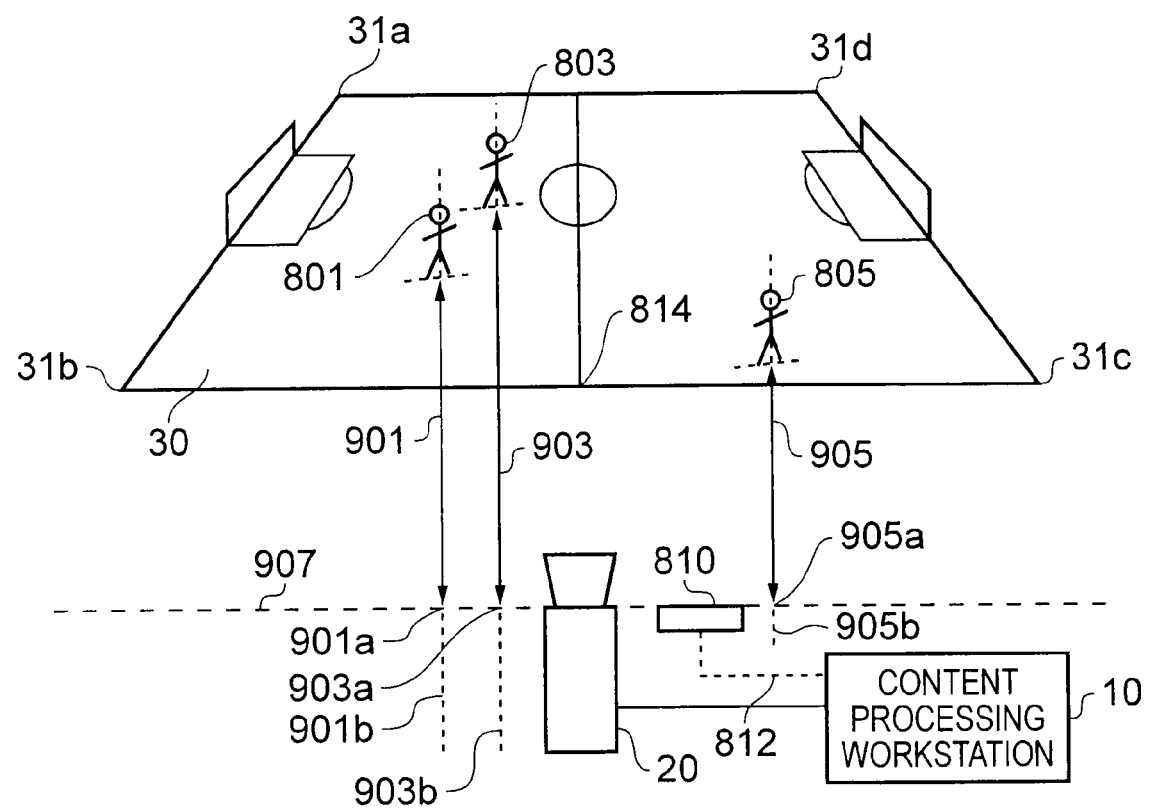
FIG. 9 is a schematic diagram of a system for determining the distance between a camera and objects within a field of view of the camera in accordance with embodiments of the present invention.

FIG. 9 is a schematic diagram of a system for determining the distance between a camera and objects within a field of view of the camera in accordance with embodiments of the present invention. The embodiment shown in FIG. 9 is substantially the same as that described above with reference to FIG. 8. However, in the embodiments shown in FIG. 9, the workstation is operable to determined a distance between an object and a reference line indicated by the dashed line 907.

As shown in FIG. 9, the reference line 907 is orthogonal to the optical axis of the camera (i.e. at right angles to the optical axis) and passes through the position of the camera. Additionally, FIG. 9 shows reference positions 901a, 903a, and 905a which lie on the reference line 907.

For example, the workstation is operable to determine a distance 901 between the reference position 901a and the player 801. The reference position 901a is located on the reference line 907 where an object reference line (indicated by dotted line 901b) for player 801 intersects the reference line 907. Similarly, the reference position 903a is located on the reference line 907 where an object reference line (indicated by dotted line 903b) for player 803 intersects the reference line 907, and the reference position 905a is located on the reference line 907 where an object reference line (indicated by dotted line 905b) intersects the reference line 907. The object reference lines 901b, 903b, and 905b are orthogonal to the reference line 907 and pass through players 801, 803 and 805 respectively.

In some embodiments, the reference line 907 is parallel to the sideline which joins corners 31b and 31c so that, when a captured image of the pitch and a modified image of the pitch are viewed together on a display in a suitable manner, all points on the side line joining corners 31b and 31c appear as if at a constant distance (depth) from the display. This improves the appearance of the three-dimensional image without having to generate an offset amount which compensates for any distortion which may arise when the image is captured using a wide angle camera or from a composite image formed by combining images captured by two or more cameras. However, it will be appreciated that the reference line need not be parallel to the sideline, and could be parallel to any other appropriate feature within the scene, or arranged with respect to any other appropriate feature within the scene.

In order for images to be generated such that, when viewed, they appear to be three-dimensional, the content processing workstation 10 is operable to detect a position of an object such as a player within the captured image. The way in which objects are detected within the image by the content processing workstation 10 is described above with reference to FIG. 2. The workstation 10 can then generate a modified image from the captured image by displacing the position of the object within the captured image by the offset amount so that, when the modified image and the captured image are viewed together as a pair of images on the display 705, the object appears to be positioned at a predetermined distance from the display. The way in which the modified image and the captured image may be displayed together is illustrated in FIG. 10.

Figure 10:
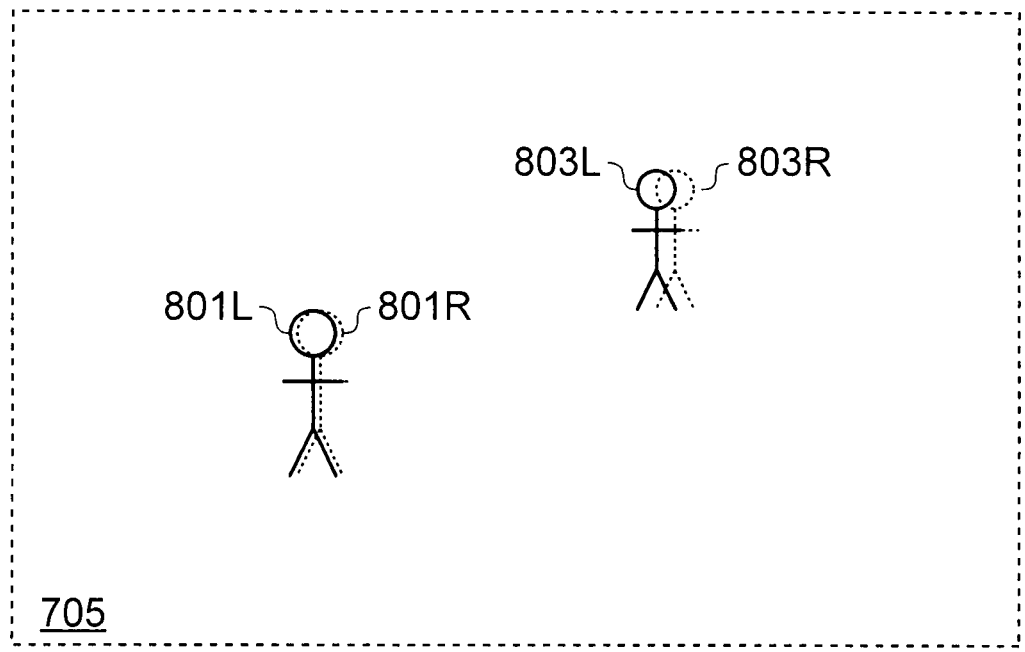
FIG. 10 shows a system for displaying images in accordance with embodiments of the present invention so that the images can be viewed as three dimensional images by a user.

FIG. 10 shows a system for displaying images in accordance with embodiments of the present invention so that the images can be viewed as three dimensional images by a user.

In particular, FIG. 10 shows images of the player 801 and the player 803 on the display 705. The image captured by the camera 20 is used to display a left-hand image 801L corresponding to the player 801 as well as a left-hand image 803L of the player 803. The left-hand images are intended to be viewed by a user's left eye, for example by the user wearing a suitable pair of polarised glasses. The workstation 10 is operable to generate a modified image from the captured image so as to generate respective right-hand image comprising each object. FIG. 10 shows a right-hand image 801R (indicated by the dashed line) corresponding to the player 801, and a right-hand image 803R (indicated by the dashed line) corresponding to the player 803. For example, when the left-hand image 801L is viewed together with the right-hand image 801R on the display 705, the player 801 will appear as if positioned at a predetermined distance from the display 705.

In order to generate the modified image from the left hand image (i.e. generate the right-hand image from the left-hand image) the workstation 10 is operable to generate a mask which corresponds to an outline of the object, such as the player. This is described above with reference to the step S40 of FIG. 2. The content processing workstation 10 is then operable to apply the offset amount image offset to pixels within the mask, so as to generate the modified image (right-hand image). This may be carried out in respect of each object which is detected within the captured image.

The offset amount for each player is dependent upon the distance between the camera and the player. For example, as shown in FIG. 8, player 801 is closer to the camera than player 803. Therefore, according to equation 1 above, for a given distance ($d_S$) between the screen and the user, the offset amount between the left-hand image 801L and the right-hand image 801R corresponding to player 801 will be smaller than the offset amount between the left-hand image 803L and the right-hand-image 803R corresponding to player 803. The apparent distance of each object can be scaled appropriately as desired, for example, so as to be displayed on a particular size of display.

It will be appreciated that in some circumstances, for example with football players on a football pitch, it may be undesirable to cause a player to appear in three dimensions at a distance from the display 705 which corresponds to the actual distance from the camera 20, as this may cause an unpleasant viewing experience for a user. Additionally, this may lose some of the three-dimensional effect if an object is rendered so as to appear tens of meters from the display. Therefore, in embodiments of the invention, the workstation 10 is operable to detect what percentage of the captured image in the vertical direction is occupied by the football pitch and scale the apparent object depth accordingly.

For example, the workstation 10 can detect a position of a sideline of the football pitch 30 which is closest to the camera 20, as well as detecting a position of a sideline of the football pitch 30 which is furthest from the camera 20, based on the mapping of the 3D model to the captured image. The workstation 10 then generates the offset amount accordingly so that objects which are at the same distance from the camera as the nearest sideline appear as if at the same distance from the user as the display.

The distance at which the farthest sideline appears from the display can then be set by the workstation 10 to be a distance corresponding to a vertical height of the display 705. However, it will be appreciated that any other suitable method of scaling the apparent object depth may be used.

Additionally, it will be appreciated that it is the physical distance between the right-hand image and the left-hand image on the display which causes the object to appear as if at a predetermined distance from the display. Therefore, in embodiments of the invention, the offset amount is initially calculated in physical units of measurement, such as millimeters. When generating the modified image for rendering as pixels on the display 705, the value of the offset amount in millimeters is scaled by the workstation 10 in dependence on any or all of: the size of display 705; the resolution of the display in pixels; and pixel pitch. These parameters may be stored in a look-up table which stores the relevant parameters for different types of display (e.g. by manufacturer and model number), or they may be input by a user.

In some embodiments, the content processing workstation 10 may cause the display 705 to display a calibration sequence of images which allows a user to provide feedback via a suitable input means as to whether, for example, an object appears at infinity, at the screen distance, and distances in between infinity and the user. However, it will be appreciated that other suitable methods of scaling the right-hand and left-hand images for output on a display may be used.

As described above, in some embodiments, the distance between the camera and the intersection point associated with an object may be determined by the workstation 10. Accordingly, in some embodiments, the offset amount may be generated in dependence upon the distance between the camera and the intersection point for that object and applied as the offset amount for the whole of that object. In other words, a player would appear two-dimensional but would appear as if positioned in three dimensions on the football pitch at a predetermined distance from the display. This advantageously reduces processing resources as the distance to each point on a player corresponding to an output pixel on the display does not have to be detected and used to generate a respective offset amount. Furthermore, this addresses a problem that such distance data may not be available from the tracking and position data generated as described above.

In some embodiments, the workstation 10 is operable to map a three-dimensional model of a stadium comprising the football pitch 30 to the captured image so that the workstation 10 can generate an appropriate offset amount for each pixel in the captured image corresponding to the stadium so as to cause the stadium and/or pitch 30 to appear as a three-dimensional image when viewed on the display 705. As the stadium and pitch are relatively static with respect to the camera 20, generation of the respective offset amounts for each pixel in the captured image may be carried out when the background image is generated, or it may be carried out periodically, so as to reduce processing resources.

In order to reduce the likelihood that undesirable image artefacts may occur in the modified image when the right-hand image (modified image) is combined with the background image, in some embodiments, the workstation 10 is operable to generate a background image of the pitch 30 as described above with reference to FIG. 2 for each captured frame. This allows adjustment of the background image in accordance any change in lighting or shadows on the pitch 30. However, it will be appreciated that the background image may be generated and updated at any other suitable frame interval, for example, every other frame.

The workstation is operable to map the three-dimensional model of the pitch to the captured image and generate an appropriate offset amount for each pixel corresponding to the pitch as described above so as to generate a modified background image. The workstation can then combine the modified right-hand image corresponding to an object such as a player with the modified background image so as to generate a combined modified image. For example, the workstation 10 can generate the combined modified image by superimposing the modified image corresponding to an object on the modified background image. When the captured image and the combined modified image are viewed together on a display in a suitable manner, they will appear to the user as if they are a three-dimensional image.

As mentioned above, the tracking data indicates where on the pitch a particular player is. This allows the workstation 10 to generate an offset amount for that player so as to cause them to appear at a three-dimensional position on the pitch when the left-hand and right hand images are displayed together on the display as a pair of images. However, if there is an ambiguity as to which track belongs to which player, or the position of the player cannot be determined by the tracking algorithm for whatever reason, the simulated 3D appearance may be lost or degraded.

Accordingly, in some embodiments of the invention, the system comprises a distance detector 810. The distance detector 810 may be coupled to the camera 20 or it may be separate to the camera 20. The distance detector is operable to generate distance data indicative of the distance between the camera 20 and an object such as a player on the pitch 30. The distance detector 810 is operable to send the distance data to the workstation 10 via a suitable communication link, as indicated by dashed line 812 in FIG. 8. The content processing workstation 10 is then operable to determine the distance between the camera and the object in dependence upon the distance data received from the distance detector 810. In other words, the distance detector 810 acts as a distance sensor. Such sensors are known in the art and may use infrared light, ultrasound, laser light and the like to detect distance to objects.

In some embodiments, the distance detector is operable to generate a distance map data which indicates, for each pixel of the captured image, a respective distance between the camera and a scene feature within the scene which coincides with that pixel. The distance data sent from the distance detector 810 to the workstation 10 can then comprise the distance map data.

To achieve this functionality, the distance detector may comprise an infrared light source which emits a pulse of infrared light. The camera 20 can then detect the intensity of the infrared light reflected from objects within the field of view of the camera at predetermined to time intervals (typically of the order of nano-seconds) so as to generate a grey scale image indicative of the distance of objects from the camera. In other words, the grey scale image can be thought of as a distance map which is generated from detecting the time of flight of the infrared light from the source to the camera.

To simplify design, the camera can comprise a distance detector in the form of an infrared light source. Such cameras are known in the art such as the "Z-Cam" manufactured by 3DV Systems. However, it will be appreciated that other known methods of generating 3D depth maps could be used, such as infrared pattern distortion detection.

It will be appreciated that any other suitable distance detector could be used. For example, a camera having an optical axis which is perpendicular to the optical axis of the camera 20 may be used to capture images of the pitch. These further captured images may be analysed by the workstation 10 to detect and track the player positions and the resultant data correlated with the image data from the camera 20 so as to triangulate the position of the players more accurately.

In some embodiments, the workstation 10 is operable to use the distance detector 810 to detect and track other objects in the field of view of the camera 20, such as a football, although it will be appreciated that any other suitable object could be detected. For example, images captured by one or more additional cameras may be analysed by the workstation 10 and combined with data from the tracking system so as to track the football and generate appropriate left-hand and right-hand images accordingly.

To generate the modified image, the workstation 10 is operable to detect object pixels within the captured image which correspond to the object within the scene. In the embodiments described above, the object pixels correspond to those pixels of the player mask used to generate the modified image as described above. The workstation can then determine the distance between the camera and the player using the distance data which is associated with the pixels of the player mask in the distance map data. To simplify three dimensional display, a mean average of distance values in the distance map data which correspond to the pixels of the player mask may be used to generate the offset amount as described above. However, it will be appreciated that any other suitable method of selecting a distance value from the distance map data corresponding to an object could be used.

In other embodiments, the workstation is operable to generate an offset amount to apply between the left-hand image and the right-hand image for each pixel in the depth map data. Consequently, when the left-hand image and the right-hand image are viewed together to as a pair of images on the display as described above, the objects may have an improved three-dimensional appearance because surface dimensionality of objects may be more accurately reproduced rather than displaying the object as if it were a two dimensional image at some distance from the display.

However, over distances of tens of meters, which are typically involved when filming sports on sports pitches, such 3D camera systems may lack the depth resolution needed to be able to generate an offset amount for each pixel corresponding to a detected object within a captured image so as to present an effective three-dimensional appearance to a user. Therefore, the embodiments described above in which the offset amount is generated in dependence upon distance data in the depth map data are more applicable to situations in which relevant objects within a scene are within a few meters of the camera. In the context of sports footage, such sports may be boxing, snooker, table tennis, tiddlywinks, gymnastics, fencing and the like, although it will be appreciated that, subject to sufficient depth resolution, other events or scenes could also be captured.

In some embodiments, the distance data from the depth map may be combined with the tracking and position data so as to improve accuracy when determining the position of the player on the pitch and hence the distance between the camera and the player.

When the above described embodiments are used to capture images of players on a football pitch, a possible problem may arise if players are all within the same area on the pitch, for example during a corner, free kick, or during a tackle. In this case, when a 3D image is reproduced on the display, the 3D appearance to a user may become muddled or unclear due to occlusion of one player by another player.

Accordingly, in embodiments of the present invention, the workstation 10 is operable to detect whether any of the players are within a threshold distance of each other within the captured image. Those players within the threshold distance of each other are then designated as belonging to a group of players. Using techniques as described above, the workstation is operable to determine the respective distance between the camera and each of the players so as to generate an average distance value indicative of the average distance between the camera and each of the of players in the group. The content processing workstation 10 is then operable to generate an offset amount, applicable to those players within the group, in dependence upon the average distance value in a similar way to that described above with reference to FIGS. 8 to 10. The workstation 10 is then operable to generate the right hand-image by displacing, with respect to the detected positions of the players within the group, each player by the offset amount for that group.

Figure 11:
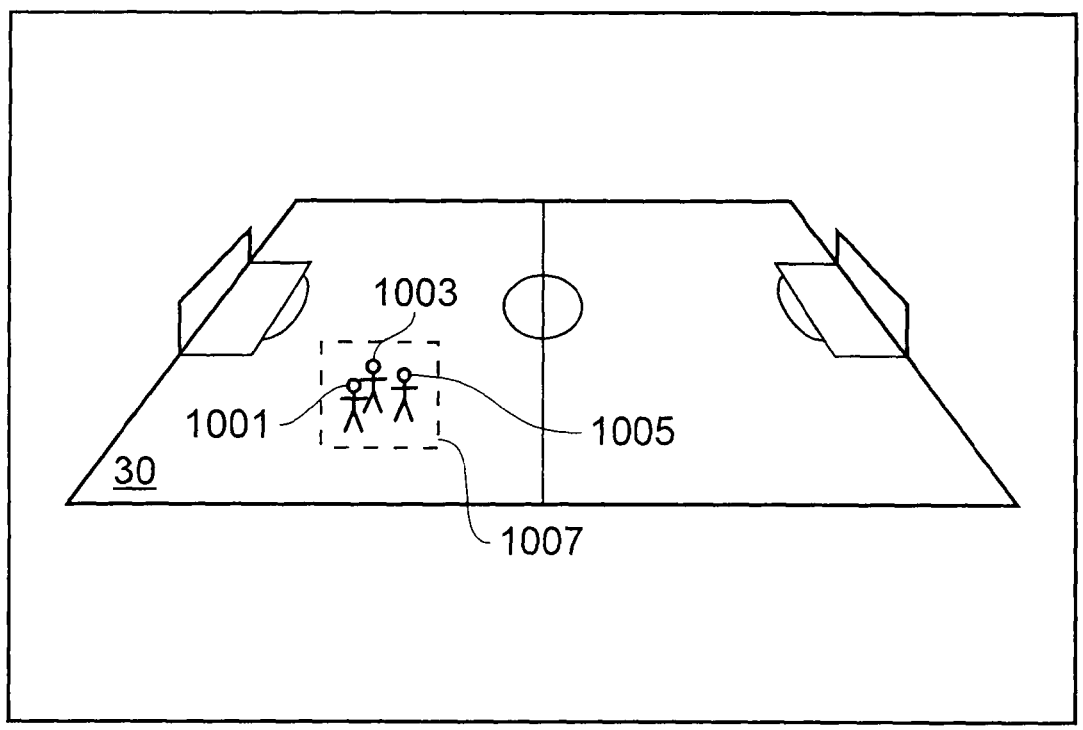
FIG. 11 shows a schematic diagram of a group of players on the pitch.

This is illustrated in FIG. 11, which shows a schematic diagram of a group of players on the pitch. In particular, FIG. 11 illustrates players 1001, 1003, and 1005 on the pitch 30. As mentioned above, the workstation 10 is operable to detect whether the players are within a threshold distance of each other. In the example shown in FIG. 11, the players 1001, 1003, and 1005 are within the threshold distance of each other and are thus designated as belonging to a group of players (as indicated by the dashed line 1007).

The workstation 10 is operable to determine the distance between each of the players in the group 1007 as described above and generate an average distance value for the players in that group. The offset amount is then generated by the workstation 10 in dependence upon the average distance value and applied as the image offset amount i for each player 1001, 1003, and 1005 in the group 1007. When the resultant left-hand and right-hand images are displayed together as a 3D image, all three players in the group will then appear at the same distance from the display 705. This simplifies 3D display, thus reducing eye fatigue for a user, especially if there is a large amount of fast game action as may frequently happen during a football match.

Figure 12:
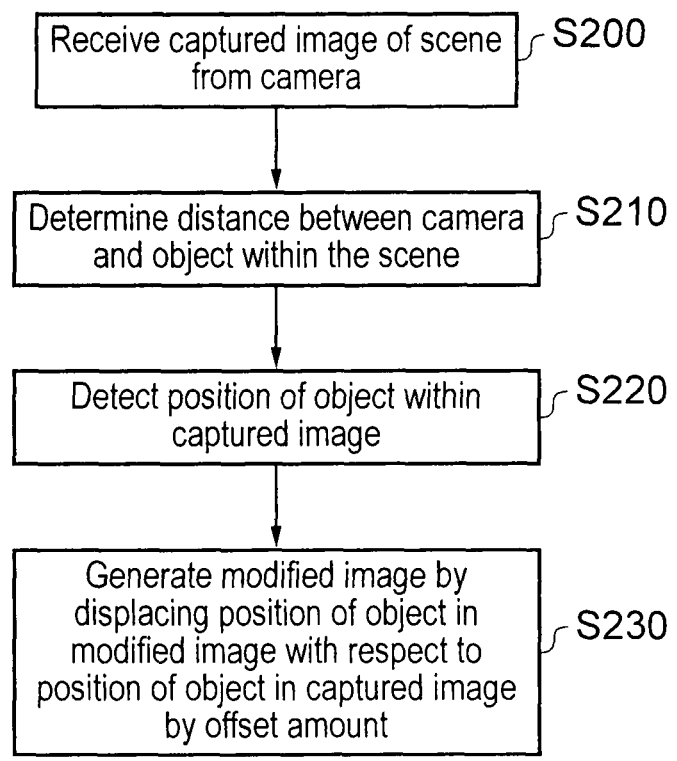
FIG. 12 shows a flowchart of an image processing method in accordance with embodiments of the present invention.

An image processing method in accordance with embodiments of the present invention will now be described with reference to FIG. 12.

At a step S200, the content processing workstation 10 receives a captured image of a scene, such as an image of a football match, from the camera 20. Then, at a step S210, the workstation 10 determines the distance between the camera and an object within the scene, such as player. The determination may be based on the position and tracking data, generated from the distance data, generated from the depth map data, or from a combination of any or all of these data, using the techniques described above.

At a step S220, the workstation 10 detects a position of the object within the captured image using the techniques described above. For example, in embodiments, the workstation can generate a player mask for each player and use the player masks when generating the modified image (right-hand image).

Then, at a step S230, the workstation 10 generates the modified image (right-hand image) by displacing the position of the object within the modified image by the offset amount. As described above, the offset amount is derived from the distance between the camera and the object. When the capture image (left-hand image) and the modified image (right-hand image) are viewed together as a pair of images on a display (for example as shown in FIG. 10), the object will appear to be positioned at a predetermined distance from the display. This advantageously allows so-called 3D images to be generated without the need for expensive stereo pairs of cameras or time consuming post-processing operations.

Although the above embodiments have been described above with reference to players of a sports game, it will be appreciated that the above described techniques may be applied to other situations where it is desirable to capture and produce 3D images.

Furthermore, it will be appreciated that although the above described embodiments have been described as carrying out image processing on one image, it will be appreciated that the above techniques may be applied to images in a sequence of video images captured by a video camera. By displacing the position of an object within a modified image with respect to a detected position of the object within captured image by an offset amount which is dependent upon a distance determined by the workstation from data such as image data or distance data, 3D images can be captured and generated so that they can be viewed by a user substantially in real time.

In the above described embodiments, image processing has been described as being carried out on an image captured by the camera 20. However, it will be appreciated that the above described techniques are equally applicable to video images which have been stitched together, for example so as to form an ultra-high resolution images such as ones generated by stitching together video images captured by cameras 22.1 and 22.2. Additionally, it will be appreciated that the captured image could be treated as the right-hand image and the modified image as the left-hand image.

It will be appreciated that in order to achieve a three-dimensional appearance for a user, the left-hand image (L) and the right-hand image (R) do not need to be displayed simultaneously on a display. For example, they can be displayed alternately at a rate which corresponds to a frame rate for each image which is faster than a user's persistent vision (typically 24 frames per second). In other words a sequence of frames comprising alternate left-hand and right-hand images (e.g. LRLRLRLRLR) could be displayed at a frame rate of 60 frames per second (i.e. 30 frames per second for each image), although any other suitable frame rate could be used. The user can then view the images using an appropriate pair of glasses which alternately blank the corresponding left image or right image so that the correct image is viewed by the correct eye. Therefore, the term "viewed together" should be understood as meaning that the left-hand image and right-hand image can be viewed simultaneously, that they can be viewed alternately, or that they can be viewed in any other suitable way such that a user perceives a three-dimensional effect.

It will be appreciated that in embodiments of the present invention, elements of the image processing method may be implemented in the content processing workstation in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

We claim:

1. An image processing device comprising:
   a receiving unit configured to receive, from a camera, a captured image corresponding to an image of a scene captured by the camera, the scene containing at least one object;
   a determining unit configured to determine a distance between the object within the scene and a reference position defined with respect to the camera; and
   a generating unit configured to detect a position of the object within the captured image, and to generate a modified image from the captured image based on image features within the captured image which correspond to the object in the scene,
   in which:
   the generating unit is operable to generate the modified image by displacing the position of the captured object within the modified image with respect to the determined position of the object within the captured image by an object offset amount which is dependent on the distance between the reference position and the object in the scene so that, when the modified image and the captured image are viewed together as a pair of images on a display, the captured object appears to be positioned at a predetermined distance from the display,
   the reference position lies on a reference line, the reference line being orthogonal to an optical axis of the camera and passing through a position of the camera, and
   the reference position is located on the reference line at a point where an object location line and the reference line intersect, the object location line being orthogonal to the reference line and passing through the object.

2. A device according to claim 1, in which the determining unit is operable to determine the distance between the reference position and the object in the scene in dependence upon distance data, the distance data being indicative of the distance between the reference position and the object in the scene.

3. A device according to claim 2, in which the distance data comprises distance map data which indicates, for each pixel of the captured image, a respective distance between the reference position and a scene feature within the scene coinciding with that pixel.

4. A device according to claim 3, in which the generating unit is operable to detect object pixels within the captured image which correspond to the object within the scene.

5. A device according to claim 4, in which:
   the object pixels together form a foreground image, and those pixels which are detected as not corresponding to the object within the scene are designated as background pixels which form a background image;
   the generating unit is operable to displace the position of the object pixels with respect to the position of the object within the captured image by the object offset amount so as to generate a modified foreground image;
   the determining unit is operable to determine the distance between the reference position and scene features in the scene which coincide with respective background pixels in dependence upon the distance data associated in the distance data map with those background pixels;
   the generating unit is operable to generate the modified image by displacing the position of each background pixel with respect to the position of that background pixel in the background image by a respective background pixel offset amount which is dependent upon the distance between the reference position and the scene feature within the scene which corresponds to that background pixel so as to generate a modified background image, and to combine the modified background image with the modified foreground image so that, when the modified image and the captured image are viewed together as a pair of images on the display, the modified image and the captured image together appear as if three-dimensional.

6. A device according to claim 4, in which the determining unit is operable to determine the distance between the reference position and the object within the scene in dependence upon the distance data associated in the distance map data with those object pixels.

7. A device according to claim 4, in which the generating unit is operable to generate the modified image by displacing the position of each object pixel with respect to the position of that pixel in the captured image by a respective object pixel offset amount which is dependent upon the distance between the reference position and the scene feature within the scene which corresponds to that object pixel.

8. A device according to claim 2, in which a predetermined three-dimensional model of at least part of the scene is mapped to known feature points within the scene; and
   the determining unit is operable to determine the distance between the reference position and the object in the scene in dependence upon the detected position of the object in the scene with respect to the predetermined three-dimensional model.

9. A device according to claim 8, in which the determining unit is operable to detect predetermined image features within the captured image which correspond to positions of the known feature points within the scene so as to map the three-dimensional model to the known feature points.

10. A device according to claim 2, in which:
    the determining unit is operable to detect a position of the object in the scene with respect to the camera, and to determine the distance between the object in the scene and the reference position in dependence upon the detected position of the object in the scene with respect to the camera.

11. A device according to claim 10, in which:
    the receiving unit is operable to receive a sequence of images captured by the camera; and
    the determining unit is operable to:
    track the position of the captured object through the sequence of images in dependence upon the detected position of the object in the scene with respect to the camera so as to generate tracking data; and
    determine the distance between the object in the scene and the reference position in dependence upon the tracking data.

12. A device according to claim 2, in which the determining unit is operable to generate the distance data by analysis of the captured image.

13. A device according to claim 2, comprising a distance data receiving unit configured to receive the distance data from a distance sensor, in which the determining unit is operable to determine the distance between the reference position and the object in the scene in dependence upon the distance data received from the distance sensor.

14. A device according to claim 1, in which:
the scene comprises a substantially planar surface;
the determining unit is operable to detect an intersection point at which the object within the scene coincides with the planar surface, and to determine the distance between the reference position and the intersection point; and
the object offset amount is dependent on the distance between the reference position and the intersection point.

15. A device according to claim 1, in which the generating unit is operable to detect a plurality of objects within the scene by analysis of the captured image;
the generating unit is operable to detect whether the plurality of objects within the scene are within a threshold distance of each other, those objects which are detected as being within the threshold distance of each other being designated as belonging to a group of objects within the scene;
the determining unit is operable to detect a respective distance between the reference position and each of the objects in the group of objects within the scene so as to generate an average distance value indicative of the average distance between the reference position and each of the of objects in the group of objects within the scene; and
if the plurality of objects in the scene are detected as being within the threshold distance of each other, the generating unit is operable to generate the modified image by displacing, with respect to detected positions of the plurality of objects within the scene, each captured object in the group of objects by a group offset amount, the group offset amount being dependent on the average distance value.

16. A device according to claim 1, in which the reference position is located at a position of the camera.

17. A device according to claim 1, in which the reference line is parallel to a scene feature within the scene.

18. A device according to claim 1, in which:
the receiving unit is operable to receive a plurality of captured images from different respective cameras having optical axes which intersect with each other, each captured image corresponding to a different image of the scene; and
the determining unit is operable to determine the distance between the object within the scene and the reference position by analysis of the captured images received from the cameras.

19. A device according to claim 1, in which the scene comprises a sports stadium having a sports pitch, and the object within the scene is a player on the sports pitch or a sports object used in that sport.

20. An image processing system comprising:
one or more cameras configured to capture an image of a scene so as to generate a captured image; and
an image processing device according to claim 1.

21. A system according to claim 20, comprising a display operable to display the modified image together with the captured image as a pair of images on the display.

22. An image processing method comprising:
receiving, from a camera, a captured image corresponding to an image of a scene captured by the camera, the scene comprising at least one object;
determining a distance between the object within the scene and a reference position defined with respect to the camera;
detecting a position of the object within the captured image; and
generating a modified image from the captured image based on image features within the captured image which correspond to the object in the scene by displacing the position of the captured object within the modified image with respect to the determined position of the object within the captured image by an object offset amount which is dependent on the distance between the reference position and the object in the scene so that, when the modified image and the captured image are viewed together as a pair of images on a display, the captured object appears to be positioned at a predetermined distance from the display, wherein
the reference position lies on a reference line, the reference line being orthogonal to an optical axis of the camera and passing through a position of the camera, and
the reference position is located on the reference line at a point where an object location line and the reference line intersect, the object location line being orthogonal to the reference line and passing through the object.

23. A non-transitory computer-readable storage medium comprising computer-readable instructions thereon, which, when executed by a computer, cause the computer to execute the method of claim 22.

* * * * *